United States Patent
Izawa (10) Patent No.: US 10,297,364 B2
(45) Date of Patent: May 21, 2019

(54) WIRE HARNESS

(71) Applicant: SUMITOMO WIRING SYSTEMS, LTD., Yokkaichi, Mie (JP)

(72) Inventor: Katsutoshi Izawa, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/982,465

(22) Filed: May 17, 2018

(65) Prior Publication Data

US 2018/0342333 A1    Nov. 29, 2018

(30) Foreign Application Priority Data

May 26, 2017 (JP) ................................ 2017-104461

(51) Int. Cl.
| | |
|---|---|
| H01B 7/04 | (2006.01) |
| H01B 7/00 | (2006.01) |
| B60R 16/02 | (2006.01) |
| H02G 3/04 | (2006.01) |
| H01R 13/6592 | (2011.01) |

(52) U.S. Cl.
CPC ....... *H01B 7/0045* (2013.01); *B60R 16/0215* (2013.01); *H02G 3/0468* (2013.01); *H02G 3/0481* (2013.01); *H01R 13/6592* (2013.01)

(58) Field of Classification Search
USPC ...................................................... 174/72 A
See application file for complete search history.

(56) References Cited

U.S. PATENT DOCUMENTS

| | | | | |
|---|---|---|---|---|
| 6,848,938 B2* | 2/2005 | Miyamoto | ........... | H01R 13/743 439/556 |
| 6,851,989 B2* | 2/2005 | Maeda | ................... | H01R 43/16 439/748 |
| 6,863,568 B2* | 3/2005 | Nakamura | ......... | H01R 13/4364 439/595 |
| 6,864,426 B2* | 3/2005 | Miyazaki | ............. | H01R 13/655 174/75 C |
| 6,866,524 B2* | 3/2005 | Takata | ............... | H01R 43/0256 439/573 |

(Continued)

FOREIGN PATENT DOCUMENTS

JP    2007-103044 A    4/2007

*Primary Examiner* — William H. Mayo, III
*Assistant Examiner* — Krystal Robinson
(74) *Attorney, Agent, or Firm* — Oliff PLC (57) ABSTRACT

A wire harness that includes an individual shield area and an overall shield area, the reliability of connection in an overlapping area where the two areas overlap each other is improved. The overlapping area includes connection members that connect an overall shield member and each of a plurality of individual shield members to each other. The connection members include a plurality of inner connection members that are respectively located in correspondence with the plurality of individual shield members, and an outer connection member that is located outside the inner connection members. Outer circumferences of the inner connection members in a combined state form a substantially circular cross-sectional shape, and an inner circumference of the outer connection member has a substantially circular cross-sectional shape that is substantially coaxial with the inner connection members that are in the combined state.

4 Claims, 5 Drawing Sheets

(56) References Cited

U.S. PATENT DOCUMENTS

| | | | | |
|---|---|---|---|---|
| 6,867,768 B2* | 3/2005 | Sakakura | ............ | B60R 16/0207 |
| | | | | 345/419 |
| 6,872,093 B2* | 3/2005 | Fukatsu | ............. | H01R 13/4362 |
| | | | | 439/595 |
| 6,875,028 B2* | 4/2005 | Kita | .................. | H01R 13/6335 |
| | | | | 439/620.26 |
| 6,875,032 B2* | 4/2005 | Tsuchiya | .............. | H01R 12/585 |
| | | | | 439/751 |
| 6,875,918 B2* | 4/2005 | Sudo | .................... | H02G 3/0468 |
| | | | | 138/108 |
| 2013/0248246 A1* | 9/2013 | Oga | .................... | B60R 16/0207 |
| | | | | 174/72 A |
| 2013/0264114 A1* | 10/2013 | Toyama | .............. | B60R 16/0207 |
| | | | | 174/72 A |

* cited by examiner

WIRE HARNESS

TECHNICAL FIELD

The present disclosure relates to a wire harness.

BACKGROUND ART

Conventionally, individual shield-type wire harnesses and overall shield-type wire harnesses are known as wire harnesses that have a shielding function. In an individual shield-type wire harness, a plurality of electrical wires and terminals are individually covered by individual shield members. In an overall shield-type wire harness, a plurality of electrical wires and terminals are covered by an overall shield member all at once. Also, a wire harnesses in which an individual shield-type connector is provided at one end in the lengthwise direction and an overall shield-type connector is provided at the other end in the lengthwise direction and thus an individual shield type and an overall shield type coexist is known as a wire harnesses that has a shielding function.

For example, JP 2007-103044A discloses the above-described coexisting type wire harness. This wire harness has a configuration in which a shield connector is provided at a midpoint in the lengthwise direction, individual enclosures that individually enclose a plurality of conductive paths (front ends of non-shielded electrical wires and metal terminal parts connected thereto) are provided at the front end of a shield shell that is provided in a housing of the shield connector, and an overall enclosure that encloses the plurality of conductive paths all at once is provided at the rear end of the shield shell. A partner connector is of the individual shield type in which bus bars are individually enclosed and shielded. However, the shield connector has the individual enclosures that individually enclose the plurality of conductive paths, and therefore the shield connector can be connected to the partner connector, and also a wire harness of the overall shield type can be connected to the partner connector of the individual shield type.

JP2007-103044a is an example of related art.

SUMMARY

In the above-described case, the shield connector and the partner connector need to be interposed at a midpoint in the lengthwise direction of the wire harness, which leads to an increase in the number of parts. Considering such a situation, there is a demand for a configuration in which an individual shield area, which is one area in the lengthwise direction of the wire harness, and an overall shield area, which is the other area in the lengthwise direction of the wire harness, overlap each other in the middle in the lengthwise direction so that an overlapping area is formed, and a plurality of individual shield members that individually enclose the electrical wires in the individual shield area, and an overall shield member that encloses the electrical wires in the overall shield area all at once, are connected to each other without a connector being interposed therebetween.

However, each individual shield member and the overall shield member are flexible like a braided wire, and therefore connection members that have a predetermined rigidity are needed in order to realize connection therebetween.

Figure 5:
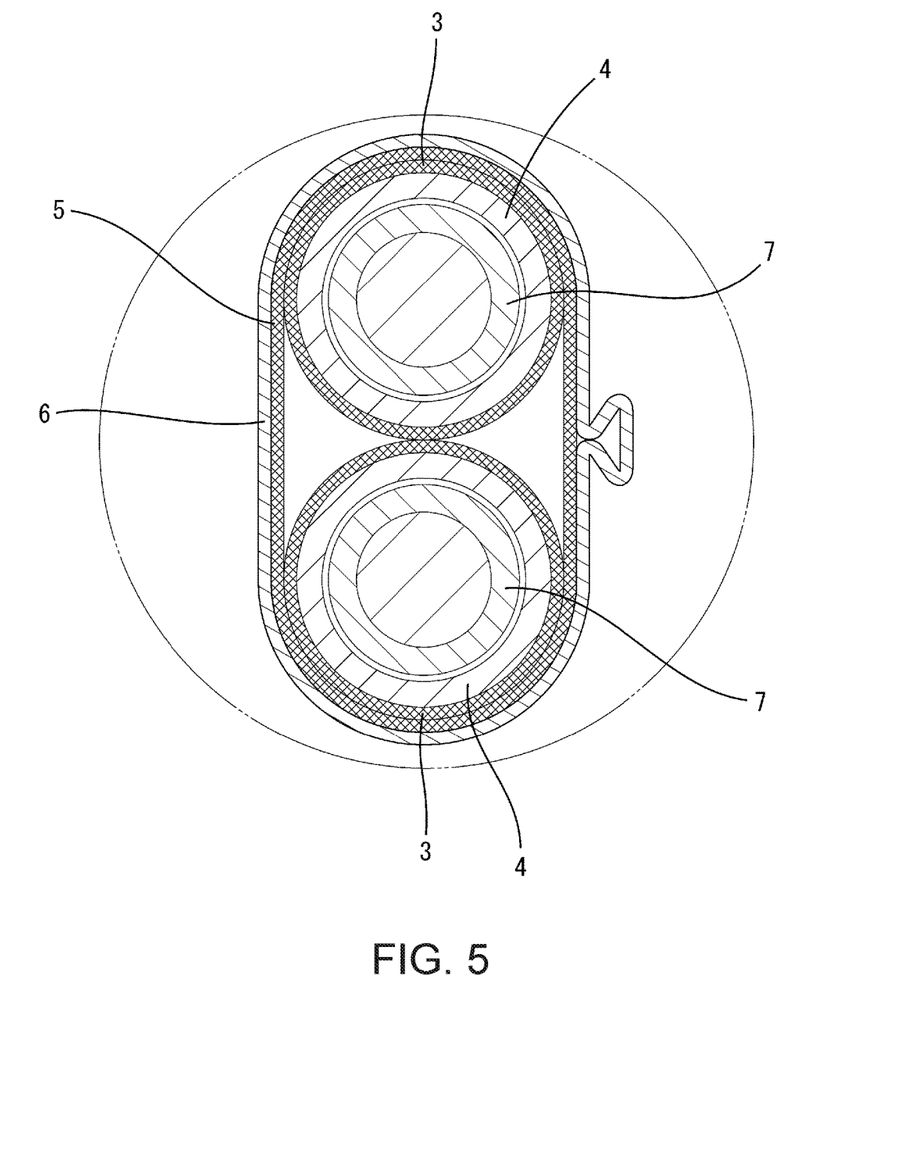
FIG. 5 shows a reference example, and is a figure corresponding to FIG. 3.

For example, as shown in a reference example in FIG. 5, the connection members include a plurality of inner connection members 4 that individually correspond to individual shield members 3, and an outer connection member 6 that is located outside the inner connection members 4 and encloses the individual shield members 3 and an overall shield member 5 all at once, and the inner connection members 4 and the outer connection member 6 are fastened to each other such that the individual shield members 3 and the overall shield member 5 are sandwiched therebetween. However, the individual shield members 3 are configured to individually cover electrical wires 7, the overall shield member 5 is configured to cover the electrical wires 7 all at once, and the individual shield members 3 and 5 do not correspond to each other. Therefore, there is the possibility of the individual shield members 3 inside the overall shield member 5 or the overall shield member 5 being displaced, and a further improvement is desired.

The present disclosure has been made in view of the above-described situation, and aims to improve a wire harness that has an individual shield area and an overall shield area in terms of the reliability of connection in an overlapping area where the two areas overlap each other.

One preferred embodiment includes: an individual shield area that includes a plurality of individual shield members that are flexible and individually cover and shield a plurality of electrical wires in one area in a lengthwise direction; an overall shield area that includes an overall shield member that is flexible and covers and shields the plurality of electrical wires all at once in another area in the lengthwise direction; and an overlapping area that is located between the individual shield area and the overall shield area and includes connection members that electrically connect the overall shield member and the plurality of individual shield members to each other, wherein the connection members include a plurality of inner connection members that are respectively located in correspondence with the plurality of individual shield members, and an outer connection member that is located outside the inner connection members such that the plurality of individual shield members and the overall shield member are sandwiched between the outer connection member and the plurality of inner connection members, and outer circumferences of the plurality of inner connection members in a combined state form a substantially circular cross-sectional shape, and an inner circumference of the outer connection member has a substantially circular cross-sectional shape that is substantially coaxial with the plurality of inner connection members that are in the combined state.

With the above-described configuration, it is possible to shield-connect the individual shield area and the overall shield area in the overlapping area without using a connector. In this case, a plurality of inner connection members are respectively located in correspondence with the plurality of individual shield members, an outer connection member is located outside the inner connection members, the inner connection members are combined such that outer circumferential surfaces of the inner connection members have a circular cross-sectional shape, and an inner circumference of the outer connection member has a circular cross-sectional shape that is substantially coaxial with the combined inner connection members that are in the combined state. Therefore, the inner connection members are prevented from being displaced inside the outer connection member. As a result, the individual shield members and the overall shield member are stably sandwiched between the outer connection member and the inner connection members. Thus, it is possible to improve the reliability of connection in the overlapping area. Note that "a substantially circular cross-sectional shape" above is a concept that is not limited to a perfectly circular cross-sectional shape, but also includes an ellipsoidal shape or the like, and an oval shape or the like.

EMBODIMENTS

The following describes preferred embodiments.

It is preferable that the plurality of inner connection members have the same shape. With this configuration, it is unnecessary to distinguish the inner connection members from each other, and it is possible to improve workability when combining them. Also, it is possible to mold the inner connection members using only one type of mold, and it is possible to reduce manufacturing costs.

Preferably, the plurality of individual shield members are respectively disposed on the inner connection members corresponding thereto such that the plurality of individual shield members are folded back from an inner surface side to an outer surface side of the inner connection members. With this configuration, it is possible to further improve the reliability of connection between the individual shield members and the inner connection members.

First Embodiment

Figure 1:
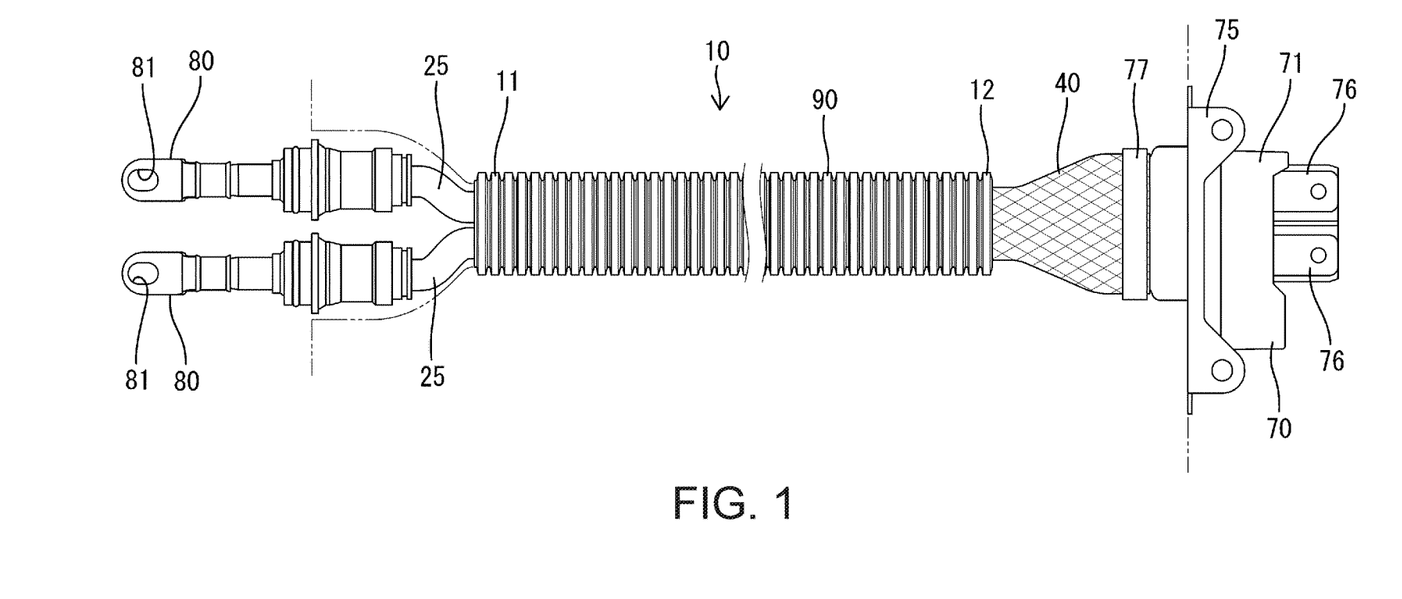
FIG. 1 is a side view showing configurations of end portions, in a lengthwise direction, of a wire harness according to a first embodiment.
Figure 2:
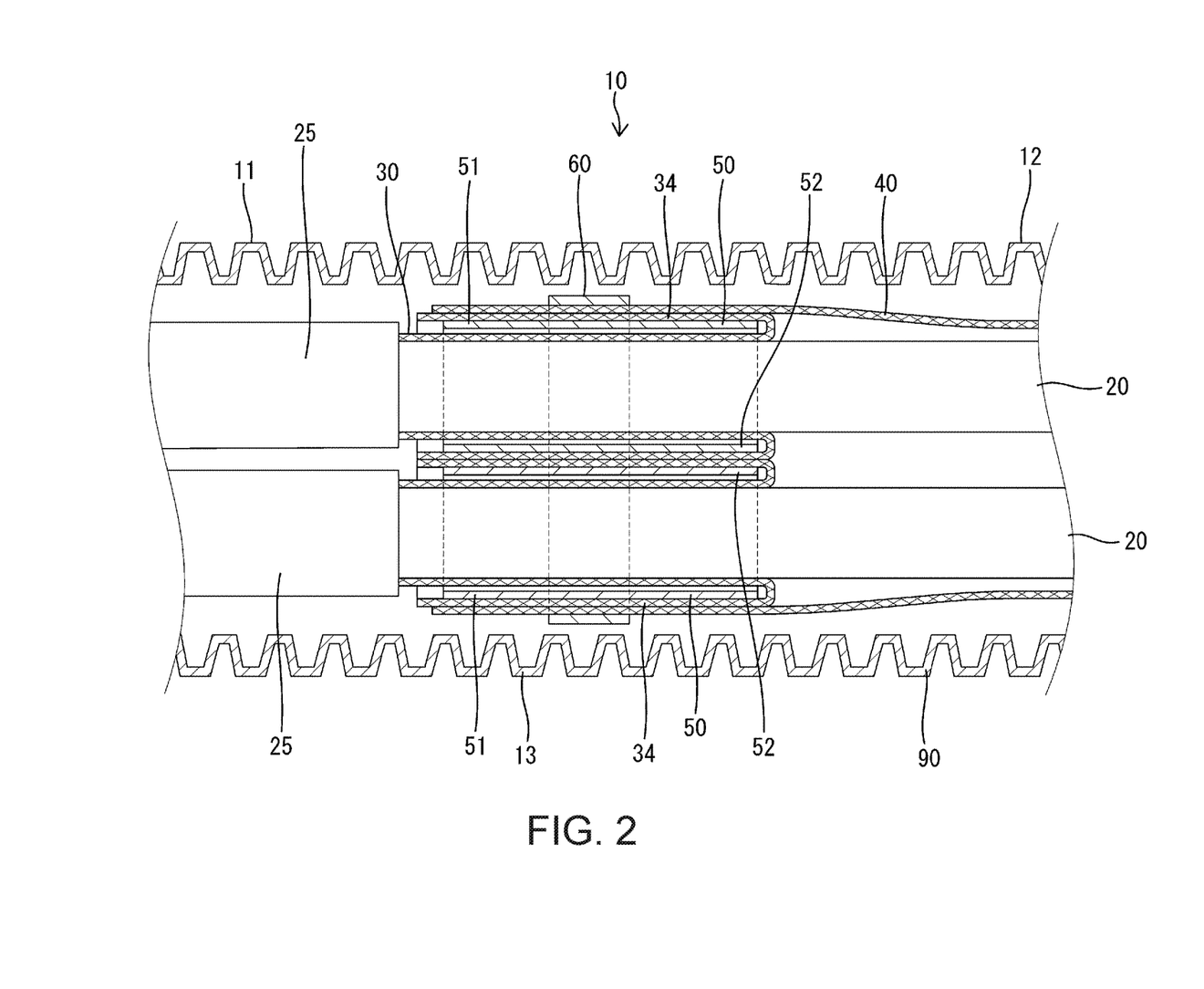
FIG. 2 is a cross-sectional view of an overlapping area of the wire harness seen from a lateral side.
Figure 3:
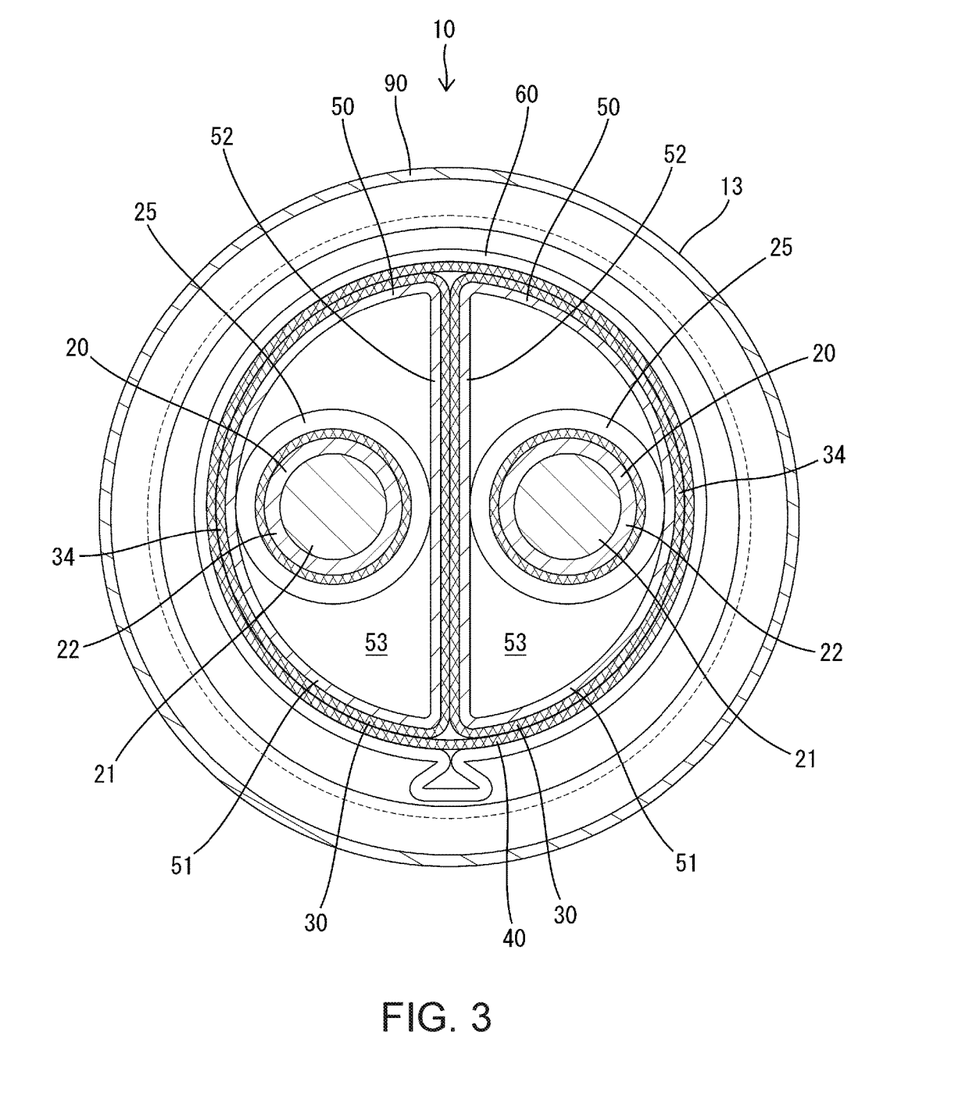
FIG. 3 is a cross-sectional view of the overlapping area of the wire harness seen from a front side.

The following describes a first embodiment with reference to FIGS. 1 to 3. A wire harness 10 according to the first embodiment is mounted on a vehicle such as a hybrid vehicle or an electric vehicle (not shown), and includes a plurality of electrical wires 20 (depicted as two electrical wires in drawings) that are routed between devices such as a motor, an inverter, and a battery (not shown).

The outermost circumferential surface of the wire harness 10 other than two end portions of the wire harness 10 in the lengthwise direction is enclosed by an exterior member 90. The exterior member 90 is, for example, a corrugated tube that has a bellows shape, is flexible, and is bendable at a position corresponding to a bending portion of a routing path. The inside of the wire harness 10 is protected by the exterior member 90 against water and external foreign objects. To make it easier to insert the electrical wires 20 into the exterior member 90, the exterior member 90 may be configured to open and close using splitting grooves that are provided in the lengthwise direction.

As shown in FIG. 3, each of the electrical wires 20 includes a plurality of core wires 21 that are conductive, and a coating 22 that is made of an insulative resin and covers the core wires 21. Each of the electrical wires 20 is a non-shielded electrical wire, which does not have its own shield structure.

As shown in FIG. 2, one area in the lengthwise direction of the wire harness 10 is an individual shield area 11, and the other area in the lengthwise direction of the wire harness 10 (an area other than the one area in the lengthwise direction) is an overall shield area 12, and the area between the individual shield area 11 and the overall shield area 12 is an overlapping area 13.

The individual shield area 11 includes a plurality of individual shield members 30 that individually cover the electrical wires 20, and sheaths 25 that are insulative and are respectively located outside the individual shield members 30. Each of the individual shield members 30 is a braided member that is tubular and is conductive and flexible (pliable), and is formed by braiding a plurality of metal strands. Each of the sheaths 25 is tubular, and covers the entire outer circumferential surface of an individual shield member 30.

As shown in FIG. 1, a plurality of connection terminals 80 that are individually connected to the electrical wires 20 are provided at an end of the individual shield area 11. Regarding each of the connection terminals 80, ends of the core wires 21 in the electrical wire 20 that corresponds to a connection terminal 80 is connected to the connection terminal 80. Also, ends of the individual shield members 30 are respectively connected to the connection terminals 80. In addition, each of the connection terminals 80 has a connection hole 81 in a leading end portion thereof, and is fastened to a partner connector of a device (not shown) using a bolt inserted into the connection hole 81, and is thus connected to the partner connector.

The overall shield area 12 includes an overall shield member 40 that covers the electrical wires 20 all at once. The overall shield member 40 is a braided member that is tubular and is conductive and flexible, and is formed by braiding a plurality of metal strands. The overall shield member 40 has a diameter that is slightly larger than that of the individual shield members 30.

As shown in FIG. 1, a shield connector 70 is provided at an end of the overall shield area 12. The shield connector 70 includes a housing 71 that can house terminals 76 that are connected to ends of the electrical wires 20. The housing 71 is provided with a shield shell 75, and an end of the overall shield member 40 is connected to the shield shell 75 via a crimp ring 77.

As shown in FIG. 2, in the overlapping area 13, ends of the individual shield members 30 protrude (are exposed) from ends of the sheaths 25 of the electrical wires 20 in the individual shield area 11, and the ends of the individual shield members 30 and the end of the overall shield member 40 in the overall shield area 12 overlap each other in a radial direction and are in contact with each other. To maintain such a contact state, the overlapping area 13 includes connection members 50 and 60.

The connection members 50 and 60 include a plurality of inner connection members 50 that individually correspond to the electrical wires 20 (and the individual shield members 30), and an outer connection member 60 that is located outside the inner connection members 50.

Each of the inner connection members 50 is a tubular member that may be made of resin, but is preferably made of metal, and is rigid enough to withstand a crimping force, which will be described later, of the outer connection member 60. As shown in FIG. 3, the inner connection members 50 have an identical shape (the same shape and the same size), and cross sections of the outer circumferential surfaces in a combined state form the shape of a circle (a perfect circle, an ellipse, an oval, etc) overall.

Specifically, each of the inner connection members 50 is a circular sector that has a central angle of 360°/N, where N is the number of electrical wires. In the first embodiment, the number (N) of electrical wires 20 is two, and therefore each of the inner connection members 50 has a semicircular arc-shaped cross section that has a central angle of 180°. More specifically, as shown in FIG. 3, each of the inner connection members 50 includes an outer circumference portion 51 that is curved along a semicircular arc, and a chord portion 52 that has a straight line shape and connects the two ends of the outer circumference portion 51 in the circumferential direction, and has an inner space 53 that is closed in the circumferential direction.

The inner space 53 of each of the inner connection members 50 allows the electrical wire 20 corresponding thereto to be inserted thereinto. As shown in FIG. 2, end portions of the individual shield members 30 extend along the inner and outer surfaces of the inner connection members 50, and are folded back at ends of the inner connection members 50. Thus, the outer surfaces of the inner connection members 50 are entirely covered by the individual shield members 30.

The outer connection member 60 is a tubular member that may be made of resin, but is preferably made of metal, and the length thereof is smaller than that of the inner connection members 50. For example, a well-known crimp ring is used as the outer connection member 60. The outer connection member 60 is configured to able to apply a crimping force to the inner connection members 50. As shown in FIG. 3, the inner circumferential surface of the outer connection member 60 after being crimped has a circular cross-sectional shape (e.g. a perfectly circular, ellipsoidal, or oval cross-sectional shape) that is substantially coaxial with the outer circumferential surfaces of the inner connection members 50 in a combined state.

Next, the following describes actions and effects of the wire harness 10 according to the first embodiment.

At the time of assembly, electrical wires 20 corresponding to the inner connection members 50 are inserted into the inner spaces 53 of the inner connection members 50, and end portions of the individual shield members 30 are folded back from the inner surface side to the outer surface side of the inner connection members 50. The end portions of the individual shield members 30 after being folded back are located in the vicinity of the sheaths 25 (see FIG. 2). Each sheath 25 is located in an inner space 53 such that one end thereof in a radial direction is in contact with or in the vicinity of the chord portion 52 of an inner connection member 50, the other end thereof in the radial direction is in contact with or in the vicinity of the outer circumference portion 51 of the inner connection member 50, and portions thereof other than the ends in the radial direction are separated from the inner surface of the inner connection members 50 (see FIG. 3). End portions of the individual shield members 30 after being folded back are located so as to abut against, or are located in the vicinity of, the outer surfaces of the chord portions 52 and the outer circumference portions 51. Portions of the end portions located along the outer surfaces of the outer circumference portions 51 are configured as connection bodies 34.

Next, the inner connection members 50 are combined to have a circular shape such that their respective chord portions 52 face each other. At this time, portions of the individual shield members 30, the portions covering the outer surfaces of the chord portions 52 of the inner connection members 50 are in contact with each other so as to substantially extend along a diameter of the circle. The connection bodies 34 of the individual shield members 30 are connected to each other so as to form a circular cross section overall.

Next, an end portion of the overall shield member 40 that continuously extends from the overall shield area 12 is placed to cover the connection bodies 34 of the inner connection members 50. The length of the overlapping portions where the end portions of the overall shield member 40 overlap the connection bodies 34 of the individual shield members 30 is longer than the length of the inner connection members 50 (see FIG. 2).

Thereafter, the outer connection member 60 is fitted onto an end portion of the overall shield member 40, and is located so as to face, from the outside, midpoints of the inner connection members 50 in the lengthwise direction. In such a state, the outer connection member 60 is crimped toward the center in a radial direction (the center of the combined inner connection members 50 in a radial direction). Thus, a crimping force that is uniform over the entire circumference is applied from the outer connection member 60 to the inner connection members 50. As a result, the connection bodies 34 of the individual shield members 30 and an end portion of the overall shield member 40 are tightly sandwiched between the outer connection member 60 and the inner connection members 50. The outer connection member 60 and the inner connection members 50 are thus brought into intimate contact in a radial direction and are electrically connected to each other. Consequently, the shielding function can be achieved over the entire length of the routing path.

As described above, according to the first embodiment, it is possible to shield-connect the individual shield area 11 and the overall shield area 12 without using a shield connector or the like, and it is possible to simplify the configuration of the wire harness 10 and reduce the number of parts of the wire harness 10.

Also, the plurality of inner connection members 50 are combined so as to form a circular cross section, and the outer connection member 60 that has circular shape that is coaxial therewith applies a crimping force that is uniform over the entire circumference, to the inner connection members 50. Therefore, the connection bodies 34 of the individual shield members 30 and an end portion of the overall shield member 40 are stably held between the connection members without being displaced. As a result, it is possible to desirably secure the reliability of connection in the overlapping area 13 without using a shield connector or the like.

Also, since the inner connection members 50 have the same shape, it is unnecessary to distinguish the inner connection members 50 from each other when combining them, and desirable workability is achieved.

Furthermore, each individual shield member 30 is folded back from the inner surface side to the outer surface side of the inner connection member 50 corresponding thereto. Therefore, it is possible to further improve the reliability of connection between the individual shield members 30 and the inner connection members 50.

Second Embodiment

Figure 4:
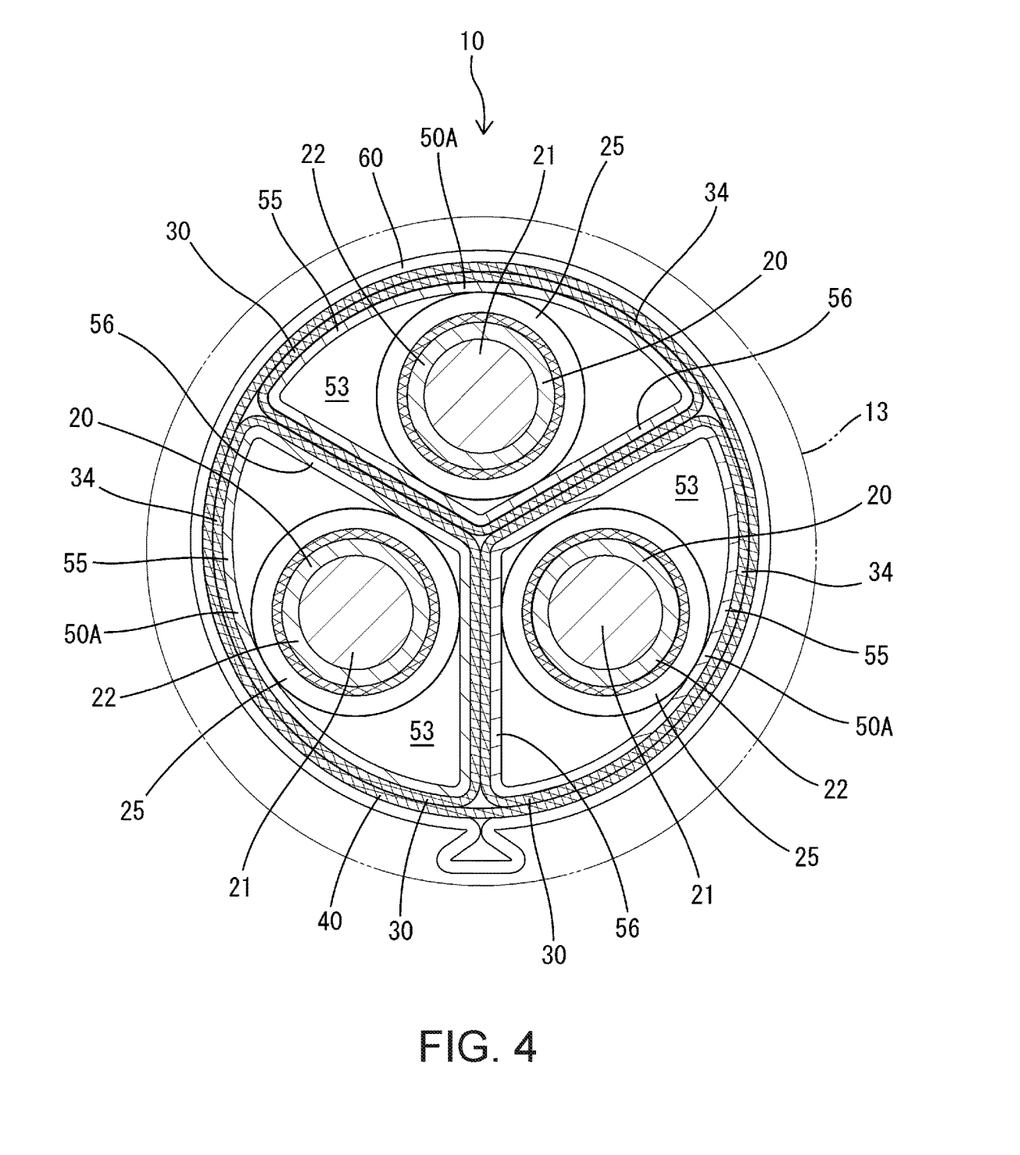
FIG. 4 shows a wire harness according to a second embodiment, and is a figure corresponding to FIG. 3.

FIG. 4 shows a second embodiment. The second embodiment is different from the first embodiment in the configuration of inner connection members 50A in the overlapping area 13 and the number of electrical wires 20, but is otherwise the same as the first embodiment. Therefore, parts that are the same as or correspond to those in the first embodiment are assigned the same reference numerals, and redundant descriptions are omitted.

As described in the first embodiment, each of the inner connection members 50A is a circular sector that has a central angle of 360°/N, where N is the number of electrical wires. In the second embodiment, the number (N) of electrical wires 20 is three, and therefore each of the inner connection members 50A has an arc-shaped cross section that has a central angle of 120°. More specifically, each of the inner connection members 50A includes an outer circumference arc portion 55 that is formed along ⅓ of the circumference of the whole circle (the cross-sectional shape of the inner connection members 50A combined together), and an expansion portion 56 that connects the center of the whole circle and the two ends of the outer circumference arc portion 55 to each other, and has a central angle of 120°. Each of the electrical wires 20 is inserted into the inner space 53 of the inner connection member 50A corresponding thereto. The second embodiment is the same as the first embodiment in terms of the feature that the individual shield members 30 extend to be folded back from the inner circumferential surface side to the outer circumferential surface side of the inner connection member 50A.

In the second embodiment, the inner connection members are combined to have a circular shape such that the sides of the expansion portions 56 face each other and the central corners of the expansion portions 56 face toward the center of the circle. Portions of the end portions of the individual shield members 30 extending along the outer surfaces of the outer circumference arc portions 55 are configured as the connection bodies 34 that are connected to each other so as to form a circular cross section overall. The overall shield member 40 is placed to cover the connection bodies 34, and the outer connection member 60 is crimped onto the inner connection members 50A. At this time, as in the first embodiment, the inner circumferential surface of the outer connection member 60 has a circular shape that is coaxial with the inner connection members 50A. Therefore, a uniform crimping force is applied to the inner connection members 50A, and the connection bodies 34 of the individual shield members 30 and end portions of the overall shield member 40 are stably sandwiched between the connection members 50A and 60.

Other Embodiments

The following briefly describes other embodiments.

(1) The inner connection members may be provided outside the sheaths, and end portions of the individual shield members may be folded back from the inner surface side of the sheaths to the outer surface side of the inner connection members.

(2) End portions of the individual shield members may be provided along only the outer surfaces of the inner connection members without being folded back.

(3) In the overlapping area, the exterior member may be configured to bulge in a radial direction so as not to interfere with the outer connection members. If this is the case, an exterior member in the overlapping area may be formed as a member that is separate from those in the individual shield area and the overall shield area.

(4) The wire harness may include a plurality of individual shield areas, overall shield areas, and overlapping areas, and may include areas other than these areas.

(5) The exterior member may be constituted by a metal tube, a resin tube, or a composite tube made of metal and resin.

(6) At least one of the individual shield members and the overall shield member may be constituted by a sheet-shaped piece of metal foil.

LIST OF REFERENCE NUMERALS

10: Wire Harness
11: Individual Shield Area
12: Overall Shield Area
13: Overlapping Area
20: Electrical Wire
30: Individual Shield Member
40: Overall Shield Member
50, 50A: Inner Connection Member
60: Outer Connection Member

What is claimed is:

1. A wire harness comprising:
an individual shield area that includes a plurality of individual shield members that are flexible and respectively each individually cover and shield one of a plurality of electrical wires in one area in a lengthwise direction;
an overall shield area that includes an overall shield member that is flexible and covers and shields the plurality of electrical wires all at once in another area in the lengthwise direction; and
an overlapping area that is located between the individual shield area and the overall shield area and includes connection members that electrically connect the overall shield member and the plurality of individual shield members to each other,
wherein
the connection members include a plurality of inner connection members that are respectively located in correspondence with the plurality of individual shield members, and an outer connection member that is located outside the inner connection members such that the plurality of individual shield members and the overall shield member are sandwiched between the outer connection member and the plurality of inner connection members,
outer circumferences of the plurality of inner connection members in a combined state form a substantially circular cross-sectional shape, and an inner circumference of the outer connection member has a substantially circular cross-sectional shape that is substantially coaxial with the plurality of inner connection members that are in the combined state, and
the inner connection members are each in a shape of a circular sector that has a central angle of 360 degrees/N, where N is a number of electrical wires representing the plurality of electrical wires, and N is two or greater.

2. The wire harness according to claim 1, wherein the plurality of inner connection members have a same shape.

3. The wire harness according to claim 2, wherein the plurality of individual shield members are respectively disposed on the inner connection members corresponding thereto such that the plurality of individual shield members are folded back from an inner surface side to an outer surface side of the inner connection members.

4. The wire harness according to claim 1, wherein the plurality of individual shield members are respectively disposed on the inner connection members corresponding thereto such that the plurality of individual shield members are folded back from an inner surface side to an outer surface side of the inner connection members.

* * * * *